US012671566B2

(12) United States Patent
Mayer et al.

(10) Patent No.: US 12,671,566 B2
(45) Date of Patent: Jun. 30, 2026

(54) TIME-ALIGNING DEVICE TRACE DATA

(71) Applicant: Infineon Technologies AG, Neubiberg (DE)

(72) Inventors: Albrecht Mayer, Waakirchen (DE); Patrik Eder, Taufkirchen (DE); Abhinaya Katta, Bristol (GB)

(73) Assignee: Infineon Technologies AG, Neubiberg (DE)

(*) Notice: Subject to any disclaimer, the term of this patent is extended or adjusted under 35 U.S.C. 154(b) by 64 days.

(21) Appl. No.: 18/817,739

(22) Filed: Aug. 28, 2024

(65) Prior Publication Data

US 2026/0067057 A1 Mar. 5, 2026

(51) Int. Cl.
*H04L 7/00* (2006.01)
*G06F 11/362* (2025.01)

(52) U.S. Cl.
CPC ........ *H04L 7/0025* (2013.01); *G06F 11/3636* (2013.01)

(58) Field of Classification Search
CPC ........................... H04L 7/0025; G06F 11/3636
See application file for complete search history.

(56) References Cited

U.S. PATENT DOCUMENTS

| | | | |
|---|---|---|---|
| 7,181,728 B1 * | 2/2007 | Thekkath | G06F 11/3636 |
| | | | 717/131 |
| 8,176,366 B2 * | 5/2012 | Horley | G06F 11/3648 |
| | | | 714/45 |

| | | | |
|---|---|---|---|
| 9,690,687 B2 * | 6/2017 | Balasubramanian | |
| | | | G06F 11/3636 |
| 2005/0033553 A1 * | 2/2005 | Swaine | G06F 11/3476 |
| | | | 714/E11.2 |
| 2013/0042155 A1 * | 2/2013 | Millet | G06F 11/3648 |
| | | | 714/45 |
| 2013/0159780 A1 * | 6/2013 | Bedwell | G06F 11/3466 |
| | | | 714/45 |
| 2014/0047262 A1 * | 2/2014 | Nixon | G06F 1/14 |
| | | | 713/400 |
| 2015/0046617 A1 * | 2/2015 | Shirlen | G06F 11/3466 |
| | | | 710/117 |
| 2019/0036803 A1 * | 1/2019 | Kumar | H04L 43/106 |

* cited by examiner

*Primary Examiner* — Freshteh N Aghdam
(74) *Attorney, Agent, or Firm* — Eschweiler & Potashnik, LLC

(57) ABSTRACT

Some aspects of the present disclosure relate to a tracing system including a tracing tool connected to a set of target devices. Each target device includes a local clock, a first counter, a second counter, a network port, a set of one or more system resources that perform operations, and a trace unit. The network port generates a timing signal from the received network-synchronizing timing frames. The trace unit advances the second counter and resets the first counter based on the timing signal. The trace unit generates local trace records having a timestamp based on the first counter, a corresponding system resource, and a corresponding operation, and provides them to the network port for forwarding to the tracing tool. The tracing tool receives the local trace records from target devices of the set of target devices, and generates a global set of trace records ordered by corresponding timestamps.

20 Claims, 3 Drawing Sheets

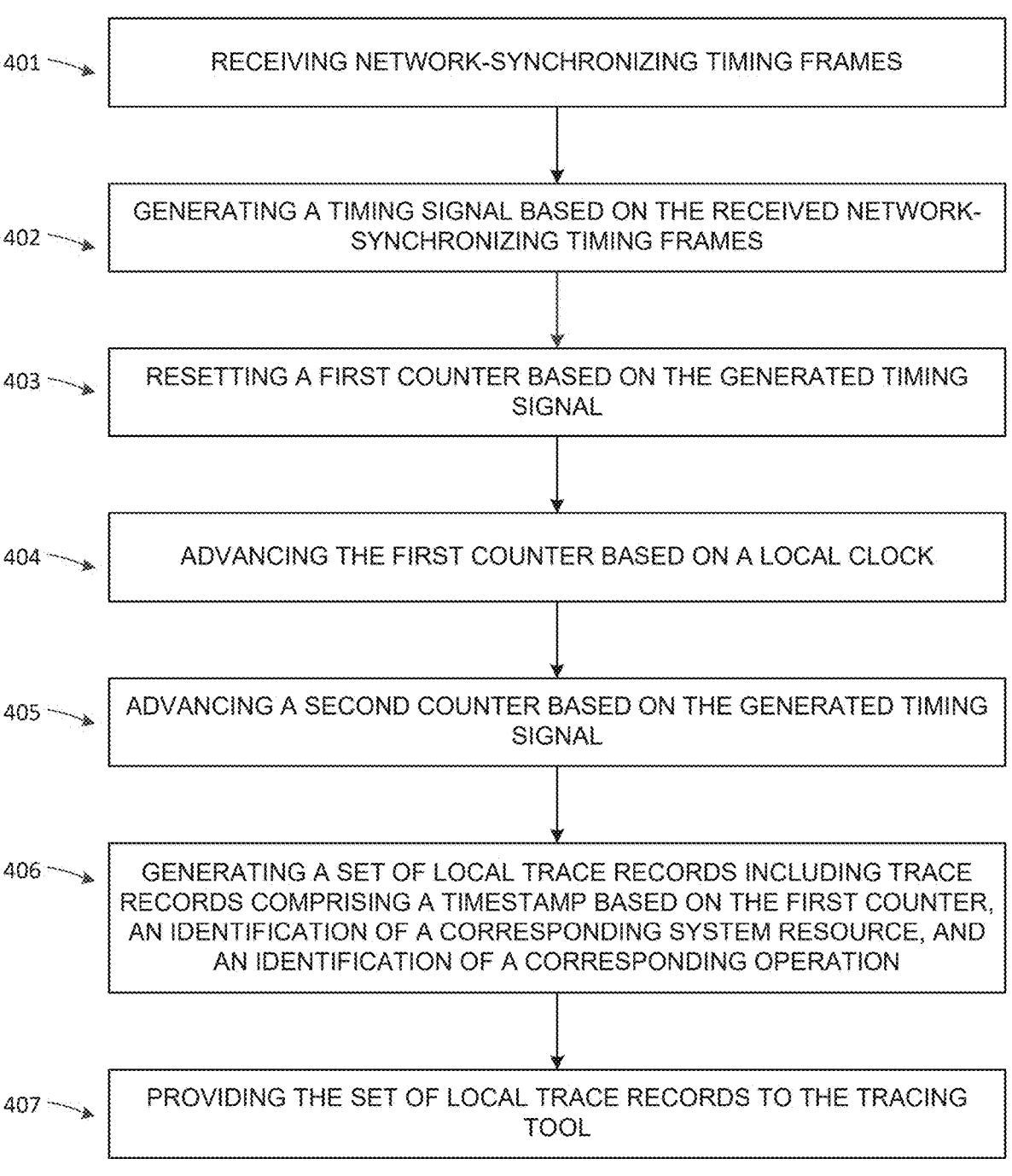

401 →    RECEIVING NETWORK-SYNCHRONIZING TIMING FRAMES

402 →    GENERATING A TIMING SIGNAL BASED ON THE RECEIVED NETWORK-SYNCHRONIZING TIMING FRAMES

403 →    RESETTING A FIRST COUNTER BASED ON THE GENERATED TIMING SIGNAL

404 →    ADVANCING THE FIRST COUNTER BASED ON A LOCAL CLOCK

405 →    ADVANCING A SECOND COUNTER BASED ON THE GENERATED TIMING SIGNAL

406 →    GENERATING A SET OF LOCAL TRACE RECORDS INCLUDING TRACE RECORDS COMPRISING A TIMESTAMP BASED ON THE FIRST COUNTER, AN IDENTIFICATION OF A CORRESPONDING SYSTEM RESOURCE, AND AN IDENTIFICATION OF A CORRESPONDING OPERATION

407 →    PROVIDING THE SET OF LOCAL TRACE RECORDS TO THE TRACING TOOL

TIME-ALIGNING DEVICE TRACE DATA

BACKGROUND

The microcontrollers (MCUs) of computer-controlled systems such as, for example, vehicles or industrial equipment, often contain a debugging subsystem to assist in monitoring system performance and responding to unexpected behaviors, bugs, faults, and the like, which might affect the system. Debugging subsystems often include tracing modules, which allow monitoring system operation and assisting in debugging unexpected behaviors by generating trace data logs of operations such as, for example, executed instructions and memory accesses. Microcontroller trace data is usually analyzed one microcontroller at a time since, for a variety of reasons, analyzing trace data from a plurality of interacting microcontrollers may be particularly challenging.

BRIEF DESCRIPTION OF THE DRAWINGS

Some examples of circuits, apparatuses and/or methods will be described in the following by way of example only. In this context, reference will be made to the accompanying Figures.

FIG. 4 is a flowchart of an example process, in accordance with some embodiments of the disclosure, for performance by, for example, a zone controller or central controller of FIG. 1.

DETAILED DESCRIPTION

Figure 1:
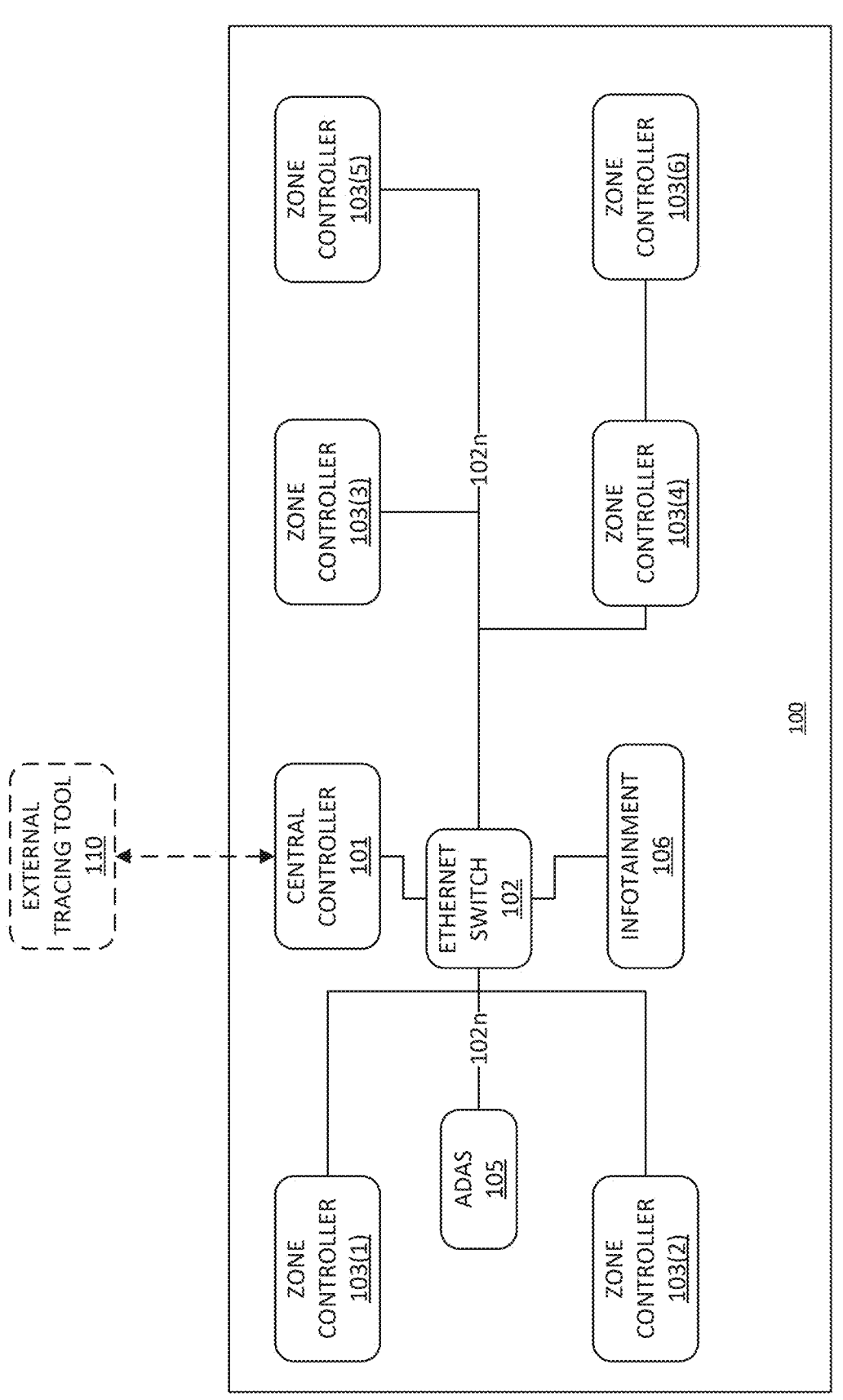
FIG. 1 illustrates an example computer-controlled system in accordance with some embodiments of the disclosure.

The present disclosure will now be described with reference to the attached drawing figures, wherein like reference numerals are used to refer to like elements throughout, and wherein the illustrated structures and devices are not necessarily drawn to scale.

Many computer-controlled systems include a plurality of integrated-circuit (IC) microcontrollers (MCUs) located throughout the system. For example, an automobile may have dozens of MCUs located in disparate locations throughout the automobile. In some systems, one or more of the MCUs include a trace infrastructure as part of the MCU's debugging system. The trace infrastructure connects to targeted system resources to generate trace data of operations performed by those system resources. Targeted system resources may include, for example, processors, memory-access modules (e.g., direct memory access (DMA) modules), and data buses. Generated trace data may include, for example, program traces that log instructions executed by processors, data traces that log memory accesses by memory-access modules, and bus traces that log bus transactions.

The generated trace data comprises data records that generally include an identification of the system resource, a characterization of the performed operation, and a corresponding timestamp. The timestamp can be used to discern the order of the traced operations and, thereby, help diagnose unexpected behavior of the system resource. The timestamps are based on a local clock of the MCU that comprises the trace infrastructure. If multiple MCUs that have independent respective local clocks have system resources that are interacting and being traced together, then the time-stamped order of traced operations may depart from the actual temporal order of traced operations if the corresponding respective clocks of the multiple MCUs are not sufficiently synchronized. Insufficient synchronization may make analysis and diagnosis of complex bugs involving multi-resource operations difficult to perform as it may be difficult to discern the actual temporal order of operations across resources from their respective timestamps.

In some embodiments in accordance with the disclosure, MCUs configured to operate in a network include a tracing infrastructure that uses a local clock that is regularly synchronized with the local clocks of other components of the network. This allows a tracing tool to correctly order traced operations from multiple components of the network in the actual order of the operations, which assists in the analysis and diagnosis of unexpected behaviors of interconnected and interacting components of the network In some embodiments in accordance with the disclosure, the network uses a time-sensitive packet-switched (or packet-based) networking protocol, such as a Time Sensitive Networking (TSN) Ethernet protocol. TSN Ethernet includes a set of standards enhancing conventional Ethernet networking in order to support real-time communication, which may be particularly useful for automotive safety systems, industrial robotic systems, audio/video streaming, and the like. TSN Ethernet allows for the development and deployment of standardized, modular, flexible, packet-switched communication networks that provide features that would otherwise require direct links between nodes and specialized communication protocols, while forgoing having direct links between all pairs of nodes and specialized communication protocols.

TSN Ethernet is particularly useful in automotive settings. For automotive safety systems such as ADAS (Advanced Driver Assistance System), TSN Ethernet allows, for example, for the synchronization of multiple sensors for sensor fusion and real-time processing with guaranteed communication bandwidth among components. For automotive infotainment systems, TSN Ethernet allows, for example, having synchronized audio and video streams, precise distribution of audio signals to different speakers within a vehicle, enhanced communication, and an improved user experience.

Nodes in a TSN Ethernet network, such as, for example, MCUs, may be synchronized by setting up a clock tree for the network with one node designated as having the grand-master clock. The grandmaster clock time is then cascaded through the clock tree, one level at a time, between pairs of directly connected nodes, until the local clocks of all of the nodes are synchronized with the grandmaster clock. Pairs of directly connected nodes have consistent delay times between them and so can synchronize their respective local clocks fairly precisely (e.g., within a few nanoseconds). The cascading synchronization of node clocks may be performed in accordance with a precision time protocol (PTP) such as, for example, defined in the IEEE 1588 standard.

TSN Ethernet allows some embodiments of systems in accordance with the disclosure to provide consistent and synchronized trace data timestamps for operations by system resources across a plurality of MCUs. Some Ethernet standards that may be relevant for these systems include IEEE 802.1Q for virtual local area networks (VLANs) and IEEE 802.1AS for time synchronization.

Each MCU is thus able to generate and provide synchronized trace information to a system tracing tool. The system-internal or system-external tracing tool can then chronologically merge and/or adjust trace information received via TSN Ethernet from multiple MCUs in the system, which, for example, enhances the ability to diagnose complex bugs involving multiple MCUs.

FIG. 1 illustrates an example computer-controlled system 100 in accordance with some embodiments of the disclosure. System 100 may correspond, for example, to an automotive system. The system 100 comprises a central controller 101 and a plurality of zone controllers 103 (e.g., zone controllers 103(1)-103(6)). The central controller 101 and the zone controllers 103 correspond to the above-described MCUs. The system 100 further includes an Advanced Driver Assistance System (ADAS) module 105 and an infotainment module 106. The controllers and modules 101, 103, 105, and 106 of the system 100 are communicatively interconnected by a TSN Ethernet network 102n, which includes an Ethernet switch 102, for routing network frames among the various nodes of the network. The Ethernet network 102n may include additional connections, switches, routers, bridges, and other networking infrastructure (not shown). The TSN Ethernet network 102n allows its nodes to set up and maintain synchronized local clocks and communicate using TSN Ethernet network frames.

An optional external trace tool 110 may selectively connect to the central controller 101, one of the zone controllers 103, or another node (not shown) of the network 102n. The external trace tool 110 may be a component of a debugging solution such as the multi-core debug solution (MCDS) from Infineon Technologies AG of Neubiberg, Germany. While connected to one node of the network 102n, the external trace tool 110 may communicate with any of the controllers 101 and 103 using the network 102n. This is particularly useful for communicating with, and obtaining time-sensitive trace data from, deeply embedded and difficult-to-access zone controllers 103.

Each of the zone controllers 103 and the central controller 101 is configured to generate TSN Ethernet frames for encapsulating trace information and transmit the frames using the TSN Ethernet network 102n. Note that frames is the term generally used to refer to the data packets at the data-link layer, e.g., Ethernet frames, while packets, on its own, may generally be understood to refer to the data packets at the network layer, e.g., IP packets. The generation of trace information may be initiated and terminated in response to, for example, a request from the external debug tool 110, error-processing by the central controller 101, or a scheduled event.

In one example implementation, the external trace tool 110 sets up tracing sessions on zone controllers 103(1) and 103(6) and then receives corresponding trace data from those zone controllers. In another example implementation, since zone controllers 103(1) and 103(6) have synchronized clocks, the trace tool 110 can trigger mechanisms inside their respective trace units to activate at a predefined time, which allows the trace tool 110 to commence tracing in multiple devices (e.g., zone controllers 103(1) and 103(6)) at the same time (with an error margin that may be in the nanosecond scale).

Figure 2:
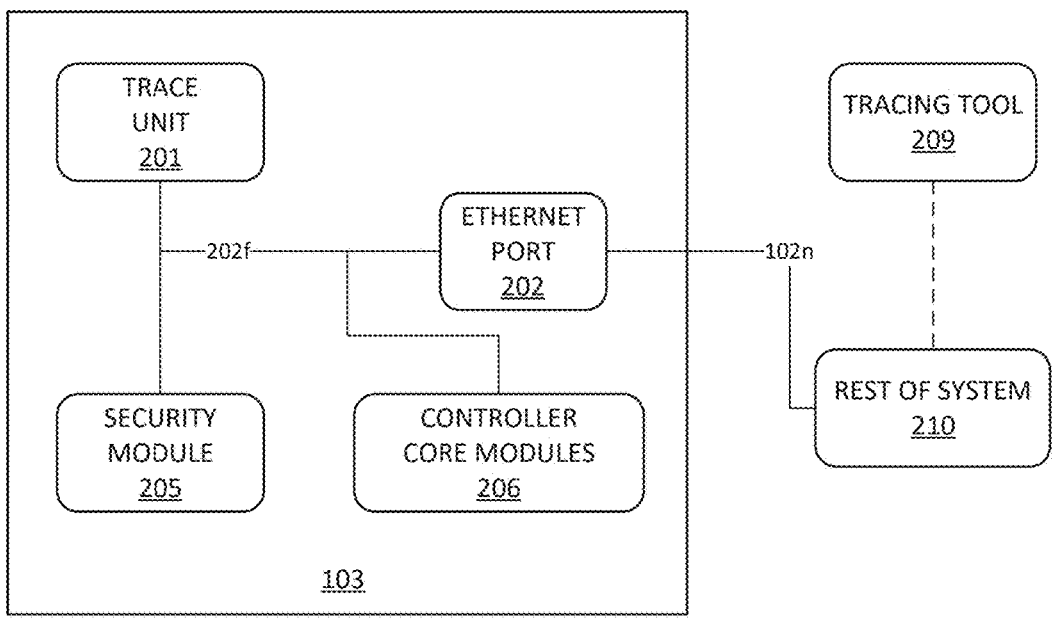
FIG. 2 illustrates an example embodiment of a zone controller of the system of FIG. 1.

FIG. 2 illustrates an example embodiment of a zone controller 103 of the system 100 of FIG. 1. The zone controller 103 is an integrated-circuit (IC) device comprising a trace unit 201, an Ethernet network port 202, a security module 205, and controller core modules 206, wherein the elements 201, 202, 205, and 206 are interconnected by an interconnect fabric 202f, which may comprise one or more buses. The zone controller 103 connects to the rest of the system 210 via the TSN Ethernet network 102n. A tracing tool 209 may be connected to the controller 103, for example, through the rest of the system 210, or directly (not shown), via the network 102n. The tracing tool 209 may correspond to the removable external tracing tool 110 of FIG. 1 or, alternatively, may correspond to a module of the system 100 such as, for example, a tracing tool module (not shown) of the central controller 101.

The trace unit 201 is configured to generate and provide trace data in response to a trace request. As noted above, trace data generally comprises a sequential, timestamped, log of operations carried out by one or more modules within, or controlled by, the zone controller 103. Such modules can include, for example, processors of the controller core modules 206, the Ethernet port 202, the interconnect fabric 202f, and/or sensors and devices (not shown) controlled by the zone controller 103. A trace request may designate particular components or operations for tracing. The trace data generated by the trace unit 201 may be used to generate corresponding trace-data payloads that also include corresponding timing information (e.g., timestamps) and which are provided to the Ethernet port 202. The timing information is based on a local clock that is synchronized by the Ethernet port 202, as explained in more detail below in reference to FIG. 3.

The Ethernet port 202 is configured to send and receive TSN Ethernet frames, which comprises encapsulating payloads for transmission with a corresponding Ethernet header and decapsulating received payloads for processing by the appropriate module of the zone controller 103. The Ethernet port 202 is configured to adjust one or more local timing resources (for example, clocks and clock-triggered counters) based on timing information received in accordance with TSN Ethernet protocols. Adjusting local timing resources corresponds to generation of timing information in accordance with the TSN Ethernet protocol.

The Ethernet port 202 may assign corresponding traffic class (TC) priority classifications to network frames generated by the Ethernet port 202. In some example implementations in which the TSN Ethernet network 102n uses eight TC classifications ranging from TC0 to TC7, TC7 represents the highest priority, TC0 represents the lowest priority, and intermediate classifications represent correspondingly intermediate priority levels. TC0 frames may be considered to have a "best effort" priority level, which are sent after higher-priority streams are done with their communication needs, but with an option to set a minimum quality of service (Qos) bandwidth.

In order to avoid interference with nominal Ethernet communication of the controller 103, typical trace-data frames may be assigned a low-priority TC classification such as, for example, TC0. Some trace-data frames, however, such as, for example, critical trace information frames, may be assigned an intermediate priority classification.

The security module 205 may be used to control access to trace features and to encrypt generated trace data. Trace features can be used by adversarial actors to hack system 100 to obtain unauthorized information or perform unauthorized actions that may be deleterious to the system 100 or its owner or operator. The access control may be accomplished by requiring valid signature keys to provide access to trace requests (which would otherwise be blocked by default).

The security module 205 may, in addition, support encryption of generated trace data. Accordingly, the security module 205 may be configured to verify that trace requests are received from trusted requestors and, if so, enable access to the trace unit 201 and provide corresponding security configuration information (e.g., encryption keys or encrypted data) for processing (e.g., encrypting) trace data received from the trace unit 201. The security module 205 may be a hardware security module (HSM). In some embodiments, the security module 205 may be implemented by using ARM TrustZone technology (ARM and TrustZone are registered trademarks of ARM Limited of Cambridge, UK).

Figure 3:
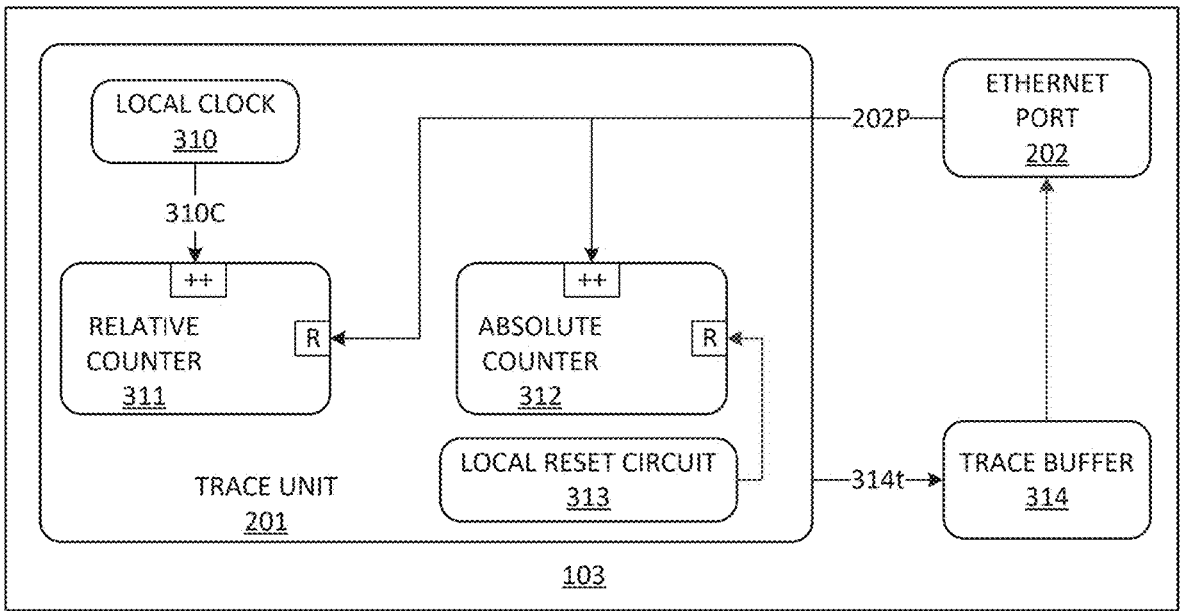
FIG. 3 illustrates example additional features of some embodiments of the zone controller of FIG. 2

FIG. 3 illustrates example additional features of some embodiments of the zone controller 103 of FIG. 2. Trace unit 201 comprises a local clock 310, a relative counter 311, an absolute counter 312, and a local reset circuit 313. The counters count ticks received at the corresponding counter-increment port (indicated by the symbol "++" in the drawings), where the counters increment by one count with each input tick. Counter ticks typically correspond to upticks of the corresponding input signal (for example, a clock signal), but may, alternatively correspond to down ticks or to both up ticks and down ticks. The counters reset to zero (which may also be referred to as overflowing or a forced overflow) in response to reset signals received at their corresponding reset ports (indicated by the symbol "R" in the drawings). When the zone controller 103 powers up, both counters 311 and 312 receive reset signals, for example, from the local reset circuit 313, as part of the power-up process. The counters may receive additional reset signals during operation, as described below.

The Ethernet Port 202 outputs a periodic pulse signal 202P based on the above-described generated timing information. In other words, the periodic pulse signal 202P is synchronized to the network time of network 102n as described above. The periodic pulse signal 202P may be a pulse-per-second (PPS) signal providing a tick every second (e.g., a 1 Hz signal). PPS signal 202P is provided to the reset port of the relative counter 311 and the counter-increment port of the absolute counter 312. The PPS signal 202P is relatively easy to implement and route as it is a simple slow single wire signal. It should be noted that although in this example the PPS signal 202P is provided by the Ethernet port 202, in alternative implementations, an alternative PPS signal, similar to PPS signal 202P, may be generated and/or provided by one or more modules other than an Ethernet port. It should also be noted that the periodic pulse signal 202P may have a period longer or shorter than 1 second; notably, its period should be set so as to reset the relative counter 311 before the relative counter 311 increments to overflow.

The relative counter 311, which may also be referred to as an emulation counter or a high-resolution counter, counts so-called fast time, based on the local clock 310. The local clock 310 generates a local clock signal 310C whose frequency is derived from the processor frequency of the zone controller 103. The processor frequency may also be referred to as the central processing unit (CPU) frequency and may, for example, be based on the oscillation frequency of a local oscillator crystal (not shown). The local clock signal 310C may have the same frequency as the processor frequency or may have a lower or higher frequency. A lower frequency for the clock signal 310C may be achieved by, for example, using a frequency divider, which may provide a precise fractional frequency (for example, a half, a third, or a quarter of the input frequency) of the processor frequency. A higher frequency for the clock signal 310C may be achieved by, for example, using a phase-lock-loop (PLL) circuit having the processor frequency as an input. In some implementations, the local clock signal 310C may have a frequency within a couple orders of magnitude of a gigahertz (for example, between 10 MHz and 10 GHz), thus having a period within a couple of orders of magnitude of a nanosecond (for example, between 100 picoseconds and 100 nanoseconds). In some implementations, the clock signal 310C has a period in the range of 1-1000 nanoseconds.

The relative counter 311 receives the clock signal 310C at its counter-increment port and increments its count on every tick of the clock signal 310C (which may correspond to, for example, an uptick, a downtick, or both). The count value of the relative counter 311 is used as a timestamp by the trace unit 201 to timestamp traced operations. The timestamp may be referred to as a tick count. Traced operations, identifying the operation and the corresponding source/target and including the corresponding timestamp from the relative counter 311 may be provided to a trace buffer 314 via path 314t. The contents of the trace buffer 314 may then be intermittently transferred to the tracing tool 209 by the Ethernet port 202. The tracing tool may add to the trace record a time-increment value corresponding to the timestamp and based on the frequency of the local clock 310. For example, a relative-counter value of 1,830 from a trace unit 201 whose clock signal 310C frequency is 250 MHz (thus having a time interval of 4 nanoseconds) corresponds to a time of 7,320 nanoseconds.

It should be noted that in some alternative implementations, the contents of the trace buffer 314 are provided to the tracing tool 209 via a different path bypassing the Ethernet port 202. In some alternative implementations, the traced operations are provided by the trace unit 201 directly to the Ethernet port 202 without using a trace buffer. In some alternative implementations, the traced operations are provided by the trace unit 201 to the tracing tool via a different path bypassing the Ethernet port 202 and without using a trace buffer.

Having a clock signal 310C frequency that is similar to the CPU frequency of the processors of the zone controller 103 allows discerning the correct order of traced operations using the corresponding timestamps. In addition to ordering and correlating among traced operations, a traced operation may also be correlated to system events of the system 100 that are not traced operations but that are otherwise tracked. For example, traced operations may be correlated to timestamped sensor readings, which may illuminate causes and/ or effects of sensor-sensed anomalies or other events. If the various system components that are timestamping operations and the sensor readings are synchronized, then relationships among them may be more accurately assessable.

The relative counter 311 receives the PPS signal 202P at its reset port. This ensures that the relative counter is regularly synchronized with the network time of the network 102n—for example, at the turn of every second. This regular synchronization avoids a temporal drift that would possibly otherwise occur due to differences among the various clocks of the system 100, which would make accurate analysis and assessment of system operations more difficult.

The absolute counter 312, which may also be referred to as a reference-clock counter or a low-resolution counter, counts so-called slow time. In some implementations, slow time has a frequency of 1 Hertz, having a period of one second. The absolute counter 312 receives the PPS signal 202P at its counter-increment port, thereby incrementing its counter value every second, in sync with other components of system 100 that sync their clocks using the time-sensitive network protocols of the network 102n.

A count value of the absolute counter 312 corresponds to a large number of relative counter values. For example, if the clock signal 310C has a frequency of 100 MHz and the PPS signal 202P has a frequency of 1 Hz, then the relative counter 311 would count increments one-hundred-millionth the duration of the increments counted by the absolute counter 312. Correspondingly, relative counter 311 would increment 100 million count values for one count value of the absolute counter 312. In some implementations, the time increments counted by the relative counter 311 are no larger than one millionth of the time increments counted by the absolute counter 312. To allow counting to 100 million, the relative counter 311 could then be implemented as a 27-bit-wide counter. It should be noted that in some implementations, narrower counters may be sufficient for a relative counter to track time differences between operations (for example, a 10-bit wide counter may be sufficient, as the more-significant bits would remain relatively constant for long sequences of operations).

The count value of the absolute counter 312 may be associated with a large set of corresponding trace records. There are multiple ways in which an absolute count value can be associated with corresponding trace records. The absolute count value may be added to each corresponding trace record. However, since the trace unit 201 may record millions of traced operations in one second, including the same absolute count value in each trace record would be unnecessarily repetitive, needlessly taking up space in the limited-size trace buffer 314 and using up unnecessarily extraneous bandwidth of the network 102n.

In some implementations, trace records are organized in so-called paragraphs, where a paragraph has a header and a payload, the payload comprising a plurality of trace records. The header includes information applicable to all of the trace records in the plurality of trace records such as, for example, a corresponding absolute timestamp. Each trace record includes a relative-counter timestamp and an identification of a corresponding operation.

In some implementations, a transmission compression scheme is used that is similar to intra-coded frames (I-frames) and predictive-coded frames (P-frames) in video transmission. Specifically, uncompressed records are intermittently generated and transmitted, with each uncompressed record typically followed by a sequence of compressed records that comprise changes (or "deltas") from the previous record. For example, an uncompressed (or "key") record may include both an absolute counter value and a relative counter value (as well as additional relevant information) and be followed by a sequence of compressed (or "delta") records that include the delta of the relative counter value for each record from the previous record, forgoing not only the absolute counter value, but also the fullness of the relative counter value. For example, a key record may be timestamped with an absolute counter value of 18 and a relative counter value of 25,000. The subsequent five delta records may be timestamped with delta values of 0, 5, 1, 1, and 6. These example delta values correspond to relative counter values of 25000, 25005, 25006, 25007, and 25013, but can be stored and transmitted using fewer bits than the full relative counter values. It should be noted that a key record might be followed by another key record (for example, if the absolute counter is incremented immediately after a key record is generated, thereby requiring another key record to indicate the new absolute counter value).

In some implementations, the trace records may forgo including an absolute counter value and the tracing tool 209 may infer the corresponding absolute counter value based on the relative counter values and the synchronization of the clocks of the tracing tool 209 and the zone controller 103 to the network time of the network 102n. Since the relative counter 311 is reset to zero at the same time that the absolute counter 312 is advanced, then the tracing tool 209 can safely determine that newly received trace records that show a reset correspond to a new absolute-counter time interval and can associate the trace records accordingly.

In some implementations, particularly if correlating trace records to events external to the zone controllers, it may be useful to associate an epoch time to a set of trace records. Epoch time (for example, Unix time or POSIX time) is measured in the number of seconds from a particular epoch start time (for example, 00:00:00 UTC on Jan. 1, 1970 for Unix epoch time) and allows the identification of a particular moment in time down to the second. For example, the C library function time_t time (time_t*seconds) returns the time since the start of the Unix Epoch measured in seconds. Epoch time may, for example, be indicated by a 64-bit integer. For reasons similar to those noted above in reference to absolute-counter values, it would not be desirable to timestamp and transmit a corresponding epoch time value with every trace record. However, as noted, it may sometimes be useful for the tracing tool 209 to associate a set of trace records with a corresponding epoch time. One way to achieve that for a trace recroding including a relative-counter value TSR (time stamp relative) having a corresponding absolute-counter value TSA (time stamp absolute) is to determine an initial epoch time, ET(i) for a corresponding initial absolute-counter value TSA(i) (e.g., 1) and then calculate the respective epoch time ET as follows:

$$ET = ET(i) + (TSA - TSA(i)) + \frac{TSR}{f_{TU}}, \qquad (1)$$

where $f_{TU}$ is a frequency of the local clock 310 of the trace unit 201. A typical TSA(i) would be 1 since that represents the first time (after device boot up) that the PPS signal 202P is received by the absolute counter 312 and, so, represents a useful synchronization start time. However, any subsequent TSA value may also be used.

In some implementations, it may be desired to calculate an epoch time for an event or time marker some local-clock ticks after a relative-counter timestamp. In such a case, the epoch time may be determined using a modification of equation (1) above, as follows:

$$ET = ET(i) + (TSA - TSA(i)) + \frac{TSR + \sum ticks}{f_{TU}}, \qquad (2)$$

where $\Sigma ticks$ is the number of local-clock ticks since the TSR time stamp until the current trace message. This may allow using and encoding lower-bit-width tick values instead of the higher-bit-width timestamp values. For example, given an ET(i) of 2024 Jul. 25 18:18 32 CET, a TSA(i) of 1, a TSA of 17, a TSR of 64075345, a $\Sigma ticks$ of 783045, and a local clock frequency $f_{TU}$ of 200 MHz, the epoch time for the current trace message would be 2024 Jul. 25 18:18 48s 324 ms 292 us CET.

The trace unit 201 may start generating trace records after boot up (when counters 311 and 312 are reset to zero) and before the clock of the zone controller 103 is synchronized to the network time of the network 102n and the first PPS signal 202P is provided to the counters 311 and 312. Since the tracing tool 209 can determine the absolute and epoch times for the first PPS signal 202P and since the relative time differences for the pre-synchronization trace records are accurate, the tracing tool can use that initial epoch time and the relative time differences to determine the actual absolute and epoch times for those trace records and can modify those trace records accordingly.

While various embodiments of a zone controller 103 have been provided above, it should be noted that the central controller 101 of the system 100 of FIG. 1 may comprise all of the above-described modules of a zone controller 103. A central controller 101 may contain additional control-related modules not present in a zone controller 103 or may, alternatively, comprise the same, or fewer, modules. It should also be noted that, while example zone controller 103 was shown as having one trace unit 201, in some embodiments, a zone controller comprises a plurality of trace units 201, each with its own corresponding relative counter 311 and absolute counter 312. In such implementations, each trace unit may also have its own local clock and local reset circuit; alternatively, two or more trace units may share a local clock and/or a local reset circuit.

FIG. 4 is a flowchart of an example process 400, in accordance with some embodiments of the disclosure, for performance by, for example, a zone controller 103 or central controller 101 of FIGS. 1-3. The process 400 starts with step 401, which is receiving network-synchronizing timing frames, e.g., in accordance with a time-sensitive packet-switched networking protocol, e.g., TSN Ethernet. The process continues with step 402, which is generating a timing signal based on the received network-synchronizing timing frames. Subsequently, step 403 is resetting a first counter based on the generated timing signal. The process then proceeds with step 404, which is advancing the first counter based on a local clock. Later, step 405 is advancing a second counter based on the generated timing signal. The process 400 then goes to step 406, which is generating a set of local trace records including trace records comprising a timestamp based on the first counter, an identification of a corresponding system resource, and an identification of a corresponding operation. The process may wrap up with step 407, which is providing the set of local trace records to the tracing tool.

While embodiments have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations.

Examples can include subject matter such as a method, means for performing acts or blocks of the method, at least one machine-readable medium including instructions that, when performed by a machine cause the machine to perform acts of the method or of an apparatus or system for detecting a non-transmitting target according to embodiments and examples described herein.

Example 1 is an integrated circuit (IC) microcontroller (MCU) including: a local clock, a first counter a network port, a set of one or more system resources configured to perform operations, and a trace unit. The local clock is configured to advance the first counter.

The network port is configured to receive network-synchronizing timing frames and generate a timing signal based on the received network-synchronizing timing frames. The trace unit is configured to: reset the first counter based on the generated timing signal, generate a set of local trace records including trace records including a timestamp based on the first counter, and an identification of a corresponding operation, and provide the set of local trace records to a tracing tool Example 2 includes the subject matter of example 1, including or omitting optional elements, further comprising a second counter, wherein the trace unit is configured to advance the second counter based on the generated timing signal, the first counter is a relative counter that counts first-time-unit increments from a first-counter reset and the second counter is an absolute counter that counts network-time-unit increments from a second-counter reset.

Example 3 includes the subject matter of example 2, including or omitting optional elements, wherein the first-time-unit increment is no more than a millionth of the network-time-unit increment.

Example 4 includes the subject matter of example 3, including or omitting optional elements, wherein: the first-time-unit increment is in a range of 1-1000 nanoseconds, the generated timing signal from the network port is a pulse-per-second (PPS) signal, and the network-time-unit increment is one second.

Example 5 includes the subject matter of example 1, including or omitting optional elements, wherein the set of one or more system resources includes: one or more processors configured to perform the operation of executing an instruction, one or more memory-access modules configured to perform the operation of accessing a given memory address, and one or more buses configured to perform the operation of transferring data.

Example 6 includes the subject matter of example 1, including or omitting optional elements, wherein the trace unit is configured to provide the set of local trace records to the tracing tool via the network port.

Example 7 includes the subject matter of example 6, including or omitting optional elements, wherein: the MCU has a local trace buffer, the trace unit is configured to provide the set of local trace records to the network port by storing the local trace records in the local trace buffer, and the network port is configured to access the local trace buffer for forwarding to the tracing tool.

Example 8 includes the subject matter of example 1, including or omitting optional elements, wherein the received network-synchronizing timing frames are in accordance with an Ethernet time-sensitive networking (TSN) protocol.

Example 9 includes the subject matter of example 1, including or omitting optional elements, wherein the trace unit is configured to generate trace records for system resources external to, and communicatively connected to, the MCU.

Example 10 includes the subject matter of example 2, including or omitting optional elements, wherein the set of local trace records further include trace records including a second timestamp based on the second counter.

Example 11 includes the subject matter of example 1, including or omitting optional elements, wherein the trace records comprising a second timestamp are paragraph-header trace records.

Example 12 is a tracing system having a tracing tool communicatively connected to a set of one or more target devices, wherein each target device includes: a local clock, a first counter, a network port, a set of one or more system resources configured to perform operations, and a trace unit. The local clock is configured to advance the first counter. The network port is configured to receive network-synchronizing timing frames, and generate a timing signal based on the received network-synchronizing timing frames. The trace unit is configured to: reset the first counter based on the generated timing signal, and generate a set of local trace records including trace records including a timestamp based on the first counter and an identification of a corresponding operation, and provide the set of local trace records to the tracing tool. The tracing tool is configured to receive the sets of local trace records from target devices of the set of target devices and generate a global set of trace records combining the received sets of local trace records, the global set of trace records ordered by corresponding timestamps.

Example 13 includes the subject matter of example 12, including or omitting optional elements, wherein the received local trace records comprise trace records for system resources external to, and communicatively connected to, the target device.

Example 14 includes the subject matter of example 12, including or omitting optional elements, wherein the received set of local trace records further include trace records including a second timestamp based on a second counter.

Example 15 includes the subject matter of example 12, including or omitting optional elements, wherein the tracing tool is configured to calculate a respective epoch time, ET, for a trace record including a first-counter value, TSR, having a corresponding second-counter value, TSA, by determining an initial epoch time, ET(i), for a corresponding initial second-counter value, TSA(i) and calculating the respective epoch time as follows:

$$ET = ET(i) + (TSA - TSA(i)) + \frac{TSR}{f_{TU}},$$

where $f_{TU}$ is a frequency of the local clock of the trace unit.

Example 16 includes the subject matter of example 12, including or omitting optional elements, wherein: the trace unit comprises a second counter, the trace unit is configured to advance the second counter based on the generated timing signal, the trace unit comprises a local reset circuit configured to reset the first and second counters on a boot up of the target device, the local clock is configured to advance the first counter before the first counter is reset by a first generated timing signal after the boot up of the target device, and the tracing tool is configured to determine an adjusted timestamp from the timestamp based on the first counter of any received local trace record generated before the first counter is reset by the first generated timing signal after the boot up of the target device.

Example 17 includes the subject matter of example 12, including or omitting optional elements, wherein the tracing tool is executed on one of a removable computer tool or a central IC controller.

Example 18 is a method for a tracing system having a tracing tool and a target device. The method includes the target device: receiving network-synchronizing timing frames, generating a timing signal based on the received network-synchronizing timing frames, resetting a first counter based on the generated timing signal, advancing the first counter based on a local clock, generating a set of local trace records including trace records including a timestamp based on the first counter and an identification of a corresponding operation, and providing the set of local trace records to the tracing tool.

Example 19 includes the subject matter of example 18, including or omitting optional elements, wherein the tracing system comprises a set of target devices including the target device and an additional target device, and the method further includes the tracing tool: receiving sets of local trace records from the target devices of the set of target devices and generating a global set of trace records combining the received sets of local trace records, the global set of trace records ordered by corresponding timestamps.

Example 20 includes the subject matter of example 18, including or omitting optional elements, further including calculating a respective epoch time, ET, for a trace record including a first-counter value, TSR, having a corresponding second-counter value, TSA, by determining an initial epoch time, ET(i), for a corresponding initial second-counter value, TSA(i) and calculating the respective epoch time as follows:

$$ET = ET(i) + (TSA - TSA(i)) + \frac{TSR}{f_{TU}},$$

where $f_{TU}$ is a frequency of the local clock.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale.

As utilized herein, terms "module", "component," "system," "circuit," "circuitry," "element," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. An integrated circuit (IC) microcontroller (MCU) comprising:
   a local clock;
   a first counter;
   a network port;
   a set of one or more system resources configured to perform operations; and
   a trace unit, wherein:
   the local clock is configured to advance the first counter;
   the network port is configured to:
      receive network-synchronizing timing frames; and
      generate a timing signal based on the received network-synchronizing timing frames; and
   the trace unit is configured to:
      reset the first counter based on the generated timing signal;
      generate a set of local trace records including trace records comprising a timestamp based on the first counter, and an identification of a corresponding operation; and
      provide the set of local trace records to a tracing tool.

2. The MCU of claim 1, further comprising a second counter, wherein:
   the trace unit is configured to advance the second counter based on the generated timing signal;
   the first counter is a relative counter that counts first-time-unit increments from a first-counter reset; and
   the second counter is an absolute counter that counts network-time-unit increments from a second-counter reset.

3. The MCU of claim 2, wherein the first-time-unit increment is no more than a millionth of the network-time-unit increment.

4. The MCU of claim 3, wherein:
   the first-time-unit increment is in a range of 1-1000 nanoseconds;
   the generated timing signal from the network port is a pulse-per-second (PPS) signal; and
   the network-time-unit increment is one second.

5. The MCU of claim 1, wherein the set of one or more system resources comprises:
   one or more processors configured to perform the operation of executing an instruction;
   one or more memory-access modules configured to perform the operation of accessing a given memory address; and
   one or more buses configured to perform the operation of transferring data.

6. The MCU of claim 1, wherein the trace unit is configured to provide the set of local trace records to the tracing tool via the network port.

7. The MCU of claim 6, wherein:
   the MCU comprises a local trace buffer;
   the trace unit is configured to provide the set of local trace records to the network port by storing the local trace records in the local trace buffer; and
   the network port is configured to access the local trace buffer for forwarding to the tracing tool.

8. The MCU of claim 1, wherein the received network-synchronizing timing frames are in accordance with an Ethernet time-sensitive networking (TSN) protocol.

9. The MCU of claim 1, wherein the trace unit is configured to generate trace records for system resources external to, and communicatively connected to, the MCU.

10. The MCU of claim 2, wherein the set of local trace records further includes trace records comprising a second timestamp based on the second counter.

11. The MCU of claim 10, wherein the trace records comprising a second timestamp are paragraph-header trace records.

12. A tracing system comprising a tracing tool communicatively connected to a set of one or more target devices, wherein:

each target device comprises:
a local clock;
a first counter;
a network port;
a set of one or more system resources configured to perform operations; and
a trace unit;
the local clock is configured to advance the first counter;
the network port is configured to:
receive network-synchronizing timing frames; and
generate a timing signal based on the received network-synchronizing timing frames;
the trace unit is configured to:
reset the first counter based on the generated timing signal; and
generate a set of local trace records including trace records comprising a timestamp based on the first counter and an identification of a corresponding operation; and
provide the set of local trace records to the tracing tool; and
the tracing tool is configured to:
receive the sets of local trace records from target devices of the set of target devices; and
generate a global set of trace records combining the received sets of local trace records, the global set of trace records ordered by corresponding timestamps.

13. The tracing system of claim 12, wherein the received local trace records comprise trace records for system resources external to, and communicatively connected to, the target device.

14. The tracing system of claim 12, wherein the received set of local trace records further includes trace records comprising a second timestamp based on a second counter.

15. The tracing system of claim 12, wherein the tracing tool is configured to calculate a respective epoch time, ET, for a trace record including a first-counter value, TSR, having a corresponding second-counter value, TSA, by:

determining an initial epoch time, ET(i), for a corresponding initial second-counter value, TSA(i); and
calculating the respective epoch time as follows:

$$ET = ET(i) + (TSA - TSA(i)) + \frac{TSR}{f_{TU}}$$

where $f_{TU}$ is a frequency of the local clock of the trace unit.

16. The tracing system of claim 12, wherein:

the trace unit comprises a second counter;
the trace unit is configured to advance the second counter based on the generated timing signal;
the trace unit comprises a local reset circuit configured to reset the first and second counters on a boot up of the target device;
the local clock is configured to advance the first counter before the first counter is reset by a first generated timing signal after the boot up of the target device; and
the tracing tool is configured to determine an adjusted timestamp from the timestamp based on the first counter of any received local trace record generated before the first counter is reset by the first generated timing signal after the boot up of the target device.

17. The tracing system of claim 12, wherein the tracing tool is executed on one of a removable computer tool or a central IC controller.

18. A method for a tracing system comprising a tracing tool and a target device, the method comprising the target device:

receiving network-synchronizing timing frames;
generating a timing signal based on the received network-synchronizing timing frames;
resetting a first counter based on the generated timing signal;
advancing the first counter based on a local clock;
generating a set of local trace records including trace records comprising a timestamp based on the first counter and an identification of a corresponding operation; and
providing the set of local trace records to the tracing tool.

19. The method of claim 18, wherein:

the tracing system comprises a set of target devices including the target device and an additional target device; and
the method further comprises the tracing tool:
receiving sets of local trace records from the target devices of the set of target devices; and
generating a global set of trace records combining the received sets of local trace records, the global set of trace records ordered by corresponding timestamps.

20. The method of claim 18, further comprising calculating a respective epoch time, ET, for a trace record including a first-counter value, TSR, having a corresponding second-counter value, TSA, by:

determining an initial epoch time, ET(i), for a corresponding initial second-counter value, TSA(i); and
calculating the respective epoch time as follows:

$$ET = ET(i) + (TSA - TSA(i)) + \frac{TSR}{f_{TU}}$$

where $f_{TU}$ is a frequency of the local clock.

* * * * *